United States Patent
Klyman

(10) Patent No.: US 10,522,008 B1
(45) Date of Patent: Dec. 31, 2019

(54) ALARM WITH PIEZOELECTRIC ELEMENT DRIVEN REPETITIVELY OVER PSEUDORANDOM FREQUENCIES

(71) Applicant: CHALLENGE/SURGE INC., Deer Park, NY (US)

(72) Inventor: Yehoshua B Klyman, Teaneck, NJ (US)

(73) Assignee: Challenge/Surge Inc., Deer Park, NY (US)

( * ) Notice: Subject to any disclaimer, the term of this patent is extended or adjusted under 35 U.S.C. 154(b) by 0 days.

(21) Appl. No.: 16/139,736

(22) Filed: Sep. 24, 2018

(51) Int. Cl.
*G08B 3/10* (2006.01)
*H04R 1/28* (2006.01)
*B60Q 5/00* (2006.01)
*H04R 17/10* (2006.01)
*G08B 7/06* (2006.01)

(52) U.S. Cl.
CPC ............ *G08B 3/10* (2013.01); *B60Q 5/00* (2013.01); *H04R 1/2873* (2013.01); *G08B 7/06* (2013.01); *H04R 17/10* (2013.01)

(58) Field of Classification Search
CPC ... G08B 3/10; G08B 7/06; B60Q 5/00; H04R 1/2873; H04R 17/10
USPC ....................................................... 340/384.6
See application file for complete search history.

(56) References Cited

U.S. PATENT DOCUMENTS

| | | |
|---|---|---|
| 4,006,371 A | 2/1977 | Quirke |
| 4,602,357 A | 7/1986 | Yang et al. |
| 5,386,479 A | 1/1995 | Hersh |
| 5,416,463 A | 5/1995 | Higgins, Jr. et al. |
| 5,463,493 A * | 10/1995 | Shah ................. G02F 1/11 359/308 |
| 5,596,311 A * | 1/1997 | Bess ................. B06B 1/0246 331/116 R |
| 6,150,923 A * | 11/2000 | Johnson ............ G08B 3/10 340/384.1 |
| 6,366,202 B1 | 4/2002 | Rosenthal |
| 7,019,621 B2 | 3/2006 | Woodard et al. |

(Continued)

FOREIGN PATENT DOCUMENTS

| | | |
|---|---|---|
| EP | 0604556 | 11/1994 |
| KR | 101563202 B1 | 10/2015 |

(Continued)

OTHER PUBLICATIONS

Crum, L. A., Pumphrey, H. C., Prosperetti, A., & Jensen, L. B. (1989). Underwater noise due to precipitation. Acoustical Society of America. Journal, 85(S1), S153-S153. DOI: 10.1121/1.2026824.

(Continued)

*Primary Examiner* — Hirdepal Singh
(74) *Attorney, Agent, or Firm* — Ellenoff Grossman & Schole LLP; John C. Stellabotte

(57) ABSTRACT

An improved pinpoint alarm system for sound localization comprising a voltage regulator logic controller, and sounder comprising a piezoelectric plate mounted in a Helmholtz generator, the logic controller configured and programmed to generate repetitively a pseudorandom frequency within a predetermined range of frequencies based on the peak or resonant frequencies of the sounder to directly or indirectly drive the sounder. The pinpoint alarm system can be used in a variety of applications, including vehicles and tracking devices.

27 Claims, 7 Drawing Sheets

(56) References Cited

U.S. PATENT DOCUMENTS

| | | | |
|---|---|---|---|
| RE44,912 E | 5/2014 | Hanson-Abbott et al. | |
| 9,445,171 B2 | 9/2016 | Hanson-Abbott et al. | |
| 2002/0027999 A1* | 3/2002 | Azima | B42D 15/022 |
| | | | 381/431 |
| 2002/0121966 A1 | 9/2002 | Woodard et al. | |
| 2005/0219040 A1* | 10/2005 | Dryer | G08B 3/10 |
| | | | 340/384.71 |
| 2007/0057778 A1 | 3/2007 | Prince et al. | |
| 2009/0241753 A1 | 10/2009 | Mann | |
| 2010/0123595 A1* | 5/2010 | Shain | G08B 3/10 |
| | | | 340/815.4 |
| 2013/0156244 A1* | 6/2013 | Hanson-Abbott | G08B 3/10 |
| | | | 381/334 |
| 2014/0098978 A1* | 4/2014 | Fukuoka | H04R 1/26 |
| | | | 381/190 |

FOREIGN PATENT DOCUMENTS

| | | |
|---|---|---|
| WO | 1998055346 A1 | 12/1998 |
| WO | 2003099468 A1 | 12/2003 |
| WO | 2005084388 A2 | 9/2005 |

OTHER PUBLICATIONS

Handzel, Amir A. and Krishnaprasad, P.S., "Biomimetic Sound-Source Localization", IEEE Sensors Journal, vol. 2, No. 6, Dec. 2002.

Larosa, Giuseppina. "Design and Development of an Acoustic Positioning System for a Cubic Kilometre Underwater Neutrino Telescope". Doctoral Thesis: Escuela Politecnica Superior de Gandia, Department of Applied Physics, Jul. 2012.

* cited by examiner

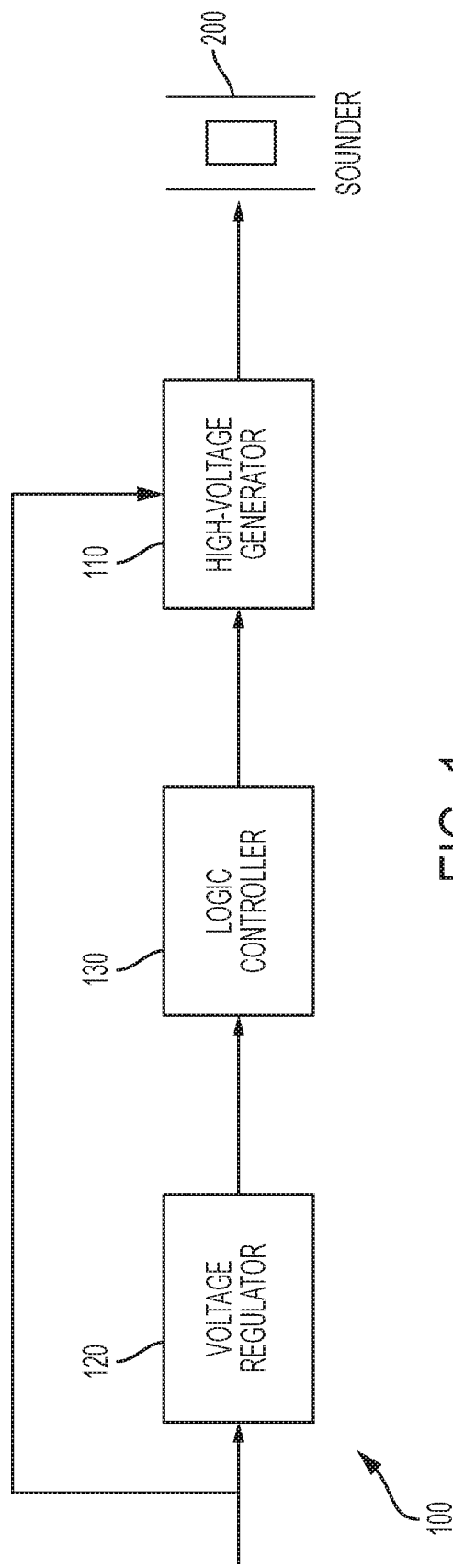

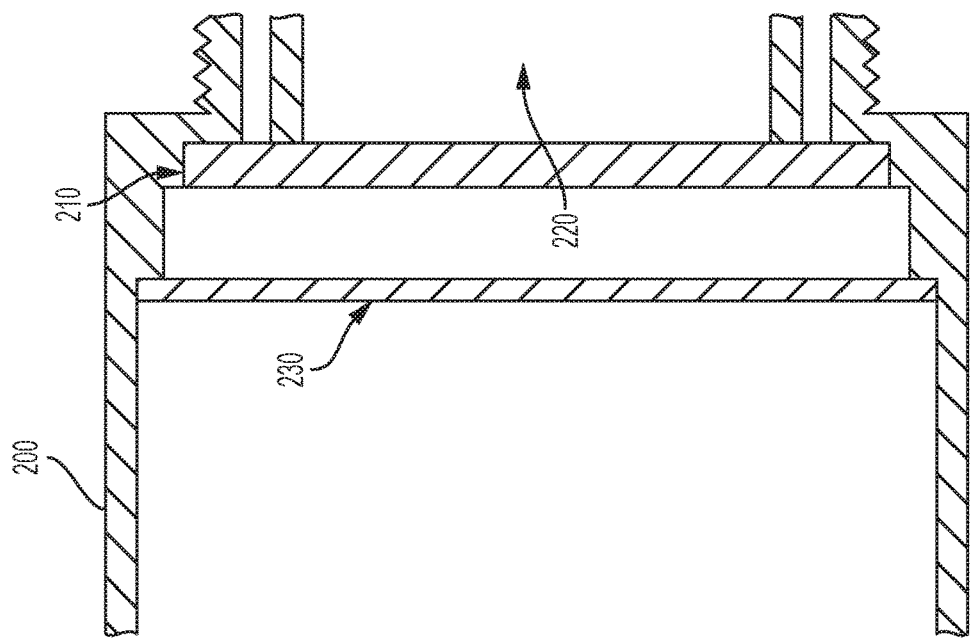
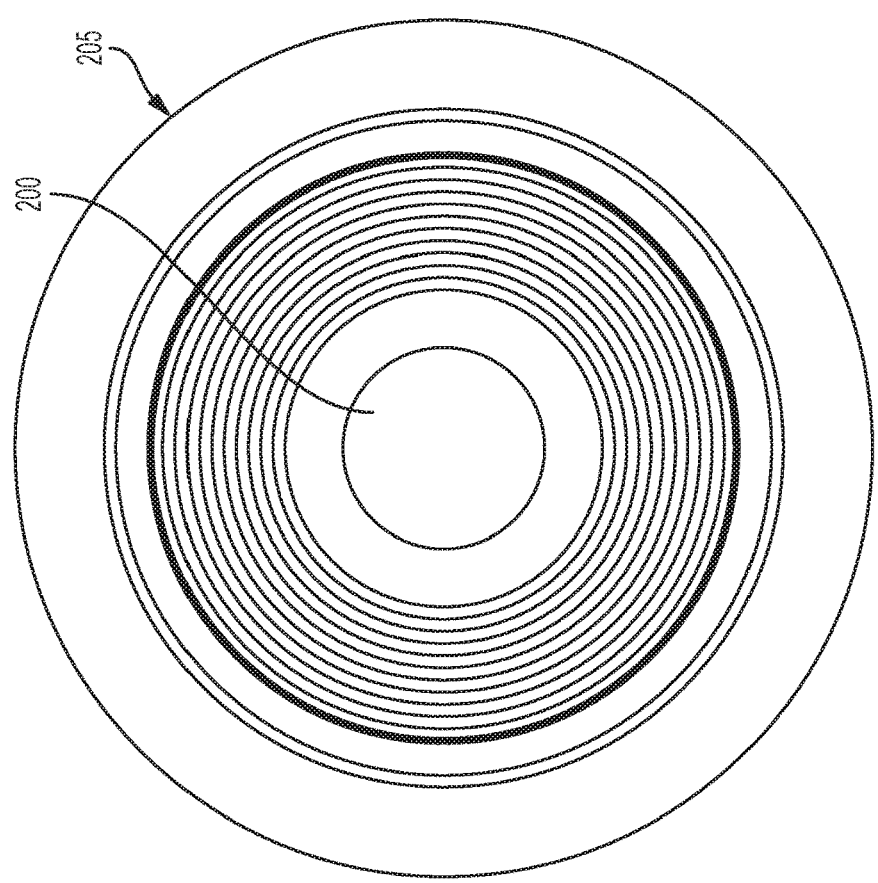
FIG. 2B
FIG. 2A

ALARM WITH PIEZOELECTRIC ELEMENT DRIVEN REPETITIVELY OVER PSEUDORANDOM FREQUENCIES

FIELD OF THE INVENTION

The present invention relates to alarms, and more specifically, to an improved alarm having a piezoelectric element that is driven repetitively over predetermined frequency ranges via a pseudorandom algorithm to create a beeping effect. The improved alarm is configured and programmed so that persons capable of hearing the sound are better able to determine the location of the alarm with an increased level of certainty over standard single, multi-frequency, or broadband alarms.

BACKGROUND

Alarms can be used in a wide variety of applications including where it is important to be able to pinpoint the location of the alarm, such as, in reversing vehicles, medical emergencies, and in hardware devices that use Bluetooth or other wireless communications protocols in combination with mobile software applications to locate lost items.

Sound localization is the listener's ability to locate a sound's origin in terms of direction and distance via auditory signals alone. The human auditory system uses several cues obtained from the sounding source to establish sound localization. The cues and theories leveraged to establish localization include but are not limited to Interaural Time differences (ITD), Interaural Intensity differences (IIDs), Head Related Transfer Function (HRTF), Correlation Theory, Pinna Filtering, the Franssen Effect and the Precedence Effect. The more cues that a sound source accurately establishes to a listener, the greater the confidence level that a sounding source establishes sound localization to the listener. All acoustic waveforms achieve some level of localization but maximizing the confidence levels of each cue establishes a much greater degree of certainty within the listener.

The Precedence Effect or Law of the First-Arriving Wavefront is a binaural psychoacoustic effect. When a sound is followed by another relatively similar sound separated by a sufficiently short time delay below the listener's echo threshold, listeners perceive a single auditory event; the event's perceived spatial location is dominated by the location of the first-arriving acoustic waveform generated by the sounding device. Often, this law applies to waveforms generated by reverberation off of physical medium. The lagging sound also affects the perceived location but is suppressed by the first-arriving sound.

Acoustic reverberation off walls and physical mediums greatly affects a listener's ability to accurately determine localization cues. When an output frequency does not complete the full propagation wavelength against a physical medium, the medium does not absorb most of the acoustic waveform but instead reflects the waveform to enable the waveform to complete. The waveform continues to be present in the acoustic environment consequently as the waveform will continue to vibrate through the sounding medium, typically air, posing an issue to localization as the new source for this reverberated waveform is off a physical medium instead of the sound originator.

The Precedence Effect in theory should dictate how the reverberation should be ignored by the listeners acoustic localization system but further experimentation after the establishment of the Precedence Effect has shown that the greater the presence of reverberation, the lesser the level of certainty for an alarm to be localized. Although the Precedence Effect is a well-known phenomenon, minimizing the necessity of the Precedence Effect enhances localization.

Interaural Time Differences, or ITDs, are established by the different arrival time sound takes to reach each ear. For a sounding source to achieve an optimal ITDs cue, low frequency waveforms typically below 1500 Hz with long wavelengths should be present, as a longer wavelength takes a sufficiently long amount of time to complete the distance between each ear, translating to a greater phase shift of the original waveform at the complementary ear.

Interaural Intensity Differences, or IIDs, are established by the different loudness levels of the sound as it reaches each ear. For a sounding source to achieve an optimal IID cue, high frequency waveforms with short wavelengths typically above 5500 Hz should be present as short wavelengths are greatly attenuated by physical impediments, which in this situation, is the listeners head.

The Head Related Transfer Function, or HRTF, is the transfer function relating how the head manipulates the input waveform as the sound passes through the head and ear pinna or Pinna Filtering. For a sounding source to achieve an optimal HRTF cue, the transfer function must establish as varied of a response as possible between the originating waveform and the perceived waveform.

A tone's fast attack onset relates to the efficacy of the Franssen Effect as a localization illusion masking a sound's origination. The Franssen Effect dictates the timing interval from a tone's original generation to a tone's full waveform reproduction, known as attack onset. Attack onset has been shown in studies to affect the human ability to establish acoustic cues. A slower attack onset enables a greater level of certainty to be established and minimizes the Franssen Effect. The theory why a slower attack onset enables greater certainty and minimizes the Franssen Effect is that the reverberant field of the room or space in which the sound is being heard has yet to be fully realized relative to the direct sound source.

There have been prior art solutions for developing pinpoint alarms that include RE 44,912, which describes an alarm is implemented with a simple electronic circuit that uses a zener diode as a signal generator, and emits pulses of broadband sound, which permit the human brain to better pinpoint the location of the sound source than is possible with single tone.

U.S. Pat. No. 9,445,171 describes another prior art pinpoint alarm solution in which a sounder for use in a mobile apparatus that comprises an electrostatic generator and an electrostatic transducer generates an audible sound comprising continuous repetitions of a pre-determined section of substantially broadband sound ranging within the full auditory spectrum and may be considered broadband as well.

Broadband acoustic sound is produced from a wide spread of frequencies within the range of audible frequencies. By contrast, narrow band sound is produced from a smaller range of frequencies defined within a specific interval.

U.S. Pat. No. 9,445,171 states that its methods may be applied to any type of sound: broadband, narrow band or another type. However, in considering the clues and theories leveraged to establish localization, the inventor has determined that alarms structured differently than the prior art pinpoint alarm solutions, such as U.S. Pat. No. 9,445,171 and RE 44,912 that rely upon continuous repetitions of broadband sound have advantages.

As described in greater detail herein below, the inventor has determined that alarms structured with a piezoelectric plate and Helmholtz resonator cavity that generate narrow band peaks based off a predetermined frequency interval can provide an increased localization certainty and be reproduced with acoustic transducer elements which have response curves capable of reproducing sound at a valuable loudness level within the above defined frequency interval.

SUMMARY OF THE INVENTION

As described in further detail herein below, a novel, improved alarm to create a beeping effect that enhances pinpoint location of the beeping alarm. The improved alarm encompasses frequency components below 1500 Hz and above 5500 Hz, maintains a slow attack onset, has unique acoustic characteristics from ambient noise and an expansive localization dataset.

In a first aspect, an alarm system is provided comprising a voltage regulator; a logic controller; and a sounder, wherein the sounder is directly or indirectly connected to the logic controller and the frequency generator, wherein the sounder comprises a piezoelectric disk mounted in a Helmholtz resonator cavity and the sounder has one or more peak or resonant frequencies, the logic controller configured and programmed to generate at least every $10^{-4}$ second a pseudorandom repetitive frequency within a predetermined range of frequencies to directly or indirectly drive the sounder, and wherein the predetermined range of frequencies is any frequency within a range of +/−8 dB of the one or more peak or resonant frequencies.

In one embodiment, the alarm system further comprises an amplifier and filter directly or indirectly connected to the voltage generator and the sounder.

In another embodiment, the one or more peak or resonant frequencies are determined from a sound pressure level (SPL) spectral response that incrementally generates increased frequencies over the sounder or measures a feedback level of an applied signal through the sounder.

In another embodiment, the predetermined frequency range is any frequency within a range of +/−6 dB from any of the one or more peak or resonant frequencies of the sounder.

In another embodiment, the logic controller is configured and programmed to generate the pseudorandom repetitive frequency within the predetermined range shifting at least every $10^{-6}$ second to directly or indirectly drive the sounder.

In another embodiment, the logic controller is configured and programmed to interrupt the generation of the pseudorandom frequency at a rate of 1 pulse per second.

In another embodiment, the logic controller is programmed to repeat continually after sweeping through all frequencies in the predetermined frequency range In another aspect, an alarm system comprising data storage and a controller connected to a loudspeaker, wherein the data storage comprises a recording of an alarm generated with an alarm system of the first aspect and the controller is configured and programmed to play the recording over the loudspeaker.

In a third aspect, a tracking device is provided comprising an alarm system comprising a sounder comprising a piezoelectric plate mounted on a Helmholtz resonator, the sounder having one or more peak or resonant frequencies; a logic controller connected to the sounder, wherein the logic controller is configured and programmed to generate a pseudorandom repetitive frequency within a predetermined range shifting at least every $10^{-4}$ second to directly or indirectly drive the sounder, wherein the predetermined rage is +/−8 dB from any of the one or more peak or resonant frequencies.

On another embodiment, the logic controller of the alarm system in the tracking device is configured and programmed to generate a pseudorandom repetitive frequency within a predetermined range shifting at least every $10^{-6}$ second to directly or indirectly drive the sounder, and the predetermined range is +/−6 dB from any of the one or more peak or resonant frequencies.

BRIEF DESCRIPTION OF THE DRAWINGS

FIG. 1 depicts an exemplary block diagram of the components of an alarm system configured and programmed in accordance with the inventions described herein.

FIG. 2A depicts the sounder of the alarm system of FIG. 1 in a housing.

FIG. 2B depicts the structure of an exemplary sounder used in the alarm system in accordance with the inventions described herein in greater detail.

DETAILED DESCRIPTION

Figure 3:
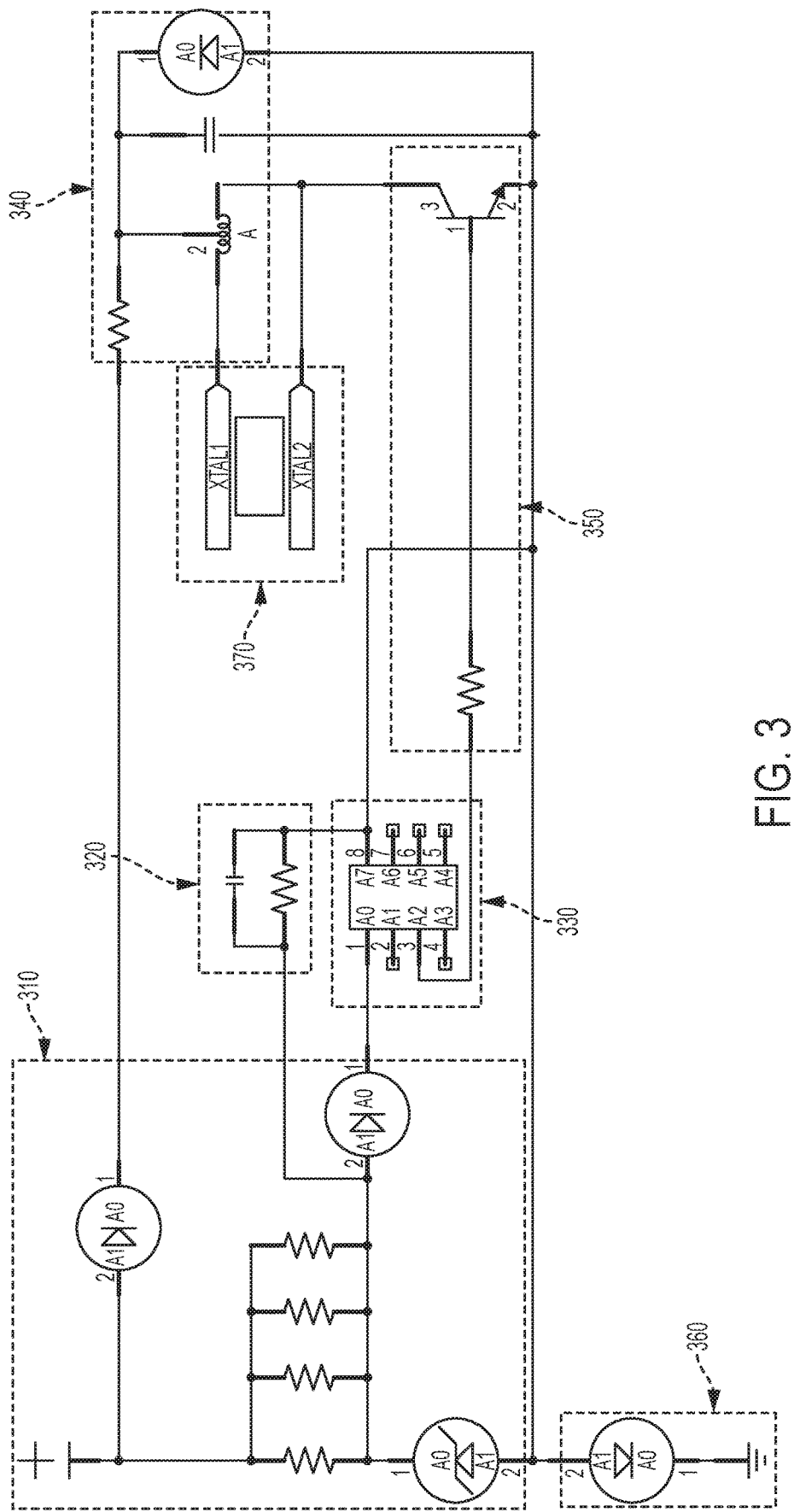
FIG. 3 depicts an exemplary circuit diagram of electronic components of the alarm system shown in FIG. 1.

The block diagram FIG. 1 shows an exemplary alarm system 100 that can be used in accordance with the inventions described herein comprising a high voltage generator 110 and a voltage regulator 120. The voltage regulator 120 accepts a wide range of input voltage from the power source (not pictured) and regulates and stabilizes it to produce an output appropriate for digital logic. The high voltage generator 110 accepts wide range input voltage from the power source (not pictured) and boosts the voltage to produce the desired loudness levels from the sounder 200.

The input voltage can be a standalone voltage generator or can be the battery included in other devices in which the sounder can be connected and incorporated, including hardware devices that use Bluetooth or other wireless communications protocols in combination with mobile software applications to locate lost keys, wallets, luggage, phones, and vehicles, for example.

The voltage regulator 120 is connected to logic controller 130, which is any logic controller capable of being configured and programmed with a software algorithm to generate an output signal. The logic controller 130 can be capable of generating a pseudorandom output frequency and timing delays to directly or indirectly drive the alarm that are necessary for the function of the alarm. The logic controller can also be configured and programmed to optionally interrupt the pseudorandom frequency at a rate of 1 pulse per second.

The output frequency is coupled to the high voltage generator 110 to boost the output frequency to the desired loudness of the physical sounder 200. The digital frequency signal can optionally be passed to a standalone frequency generator, timing module or filter (not pictured) to generate desired timing and output for the alarm.

FIG. 2A depicts the sounder 200 incorporating the system that powers it in a housing 205. FIG. 2B depicts sounder 200 in greater detail. Sounder 200 comprises piezoelectric disk 210 mounted in a Helmholtz resonator cavity 220 driven by drive circuitry 230. The drive circuitry 230 comprises the high voltage generator 110, voltage regulator 120, logic controller 130 described in the exemplary block diagram of FIG. 1. The mounting of the piezoelectric disk 210 can accomplished in any way which boosts a specific defined frequency or frequency range determined by the Helmholtz equation. The combination of the piezoelectric disk 210 mounted in the Helmholtz cavity 220 is a structure known to those skilled in the art. High voltage generator 110 of FIG. 1 boosts the output loudness to the piezoelectric disk 210.

FIG. 3 depicts an exemplary block circuit diagram of a sounder system implemented in accordance with the inventions described herein. FIG. 3 shows power supply and regulation block 310, filter 320, logic controller 330, loudness booster or regulator 340, logic frequency coupler 350, reverse polarity protection 360, and sounder 370. Those of skill in the art will recognize that there are many alternative ways in which the circuit block can be structured to achieve the inventions described herein.

Resonance is a phenomenon in which a vibrating system or external force drives another system to oscillate with greater amplitude at specific frequencies ideal to the secondary system. Frequencies at which the response amplitude is a relative maximum are known as the system's resonant frequencies or resonance. There are harmonics and subharmonics of a system's resonant frequencies generated when the resonant frequency is output with certain conditions. The harmonics are frequency multiples greater than the output frequency, $2*\omega$, $3*\omega$, $4*\omega$, etc. where $\omega$ is the output frequency and subharmonics are frequency multiples less than the output frequency, $\omega/2$, $\omega/3$, $\omega/4$. For example, a signal at 3000 Hz will generate harmonics at 6000, 9000, 1200 Hz and subharmonics at 1500, 1000, 750 Hz, etc. The output loudness for each harmonic and subharmonic will often vary depending on the input signal and can be most easily reproduced when passing a square wave to the driving system. At resonant frequencies, small periodic driving forces can produce large amplitude oscillations, due to the storage and reproduction of vibrational energy.

The determination of one or more resonance frequencies of a sounder, such as sounder 200, is known to persons of skill in the art. One way to determine the resonance frequency or frequencies of sounder 200 is to perform a sound pressure level (SPL) spectral response that incrementally generates increased frequencies over the sounder 200. Another way to determine resonant frequency or resonant frequencies is to measure the feedback or current draw from an electrical excitation to the system when excited by an incrementally increased frequency input. How to perform an SPL spectral response over a sounder and measure the feedback or current draw, such as sounder 200, is known to those of skill in the art.

Figure 4:
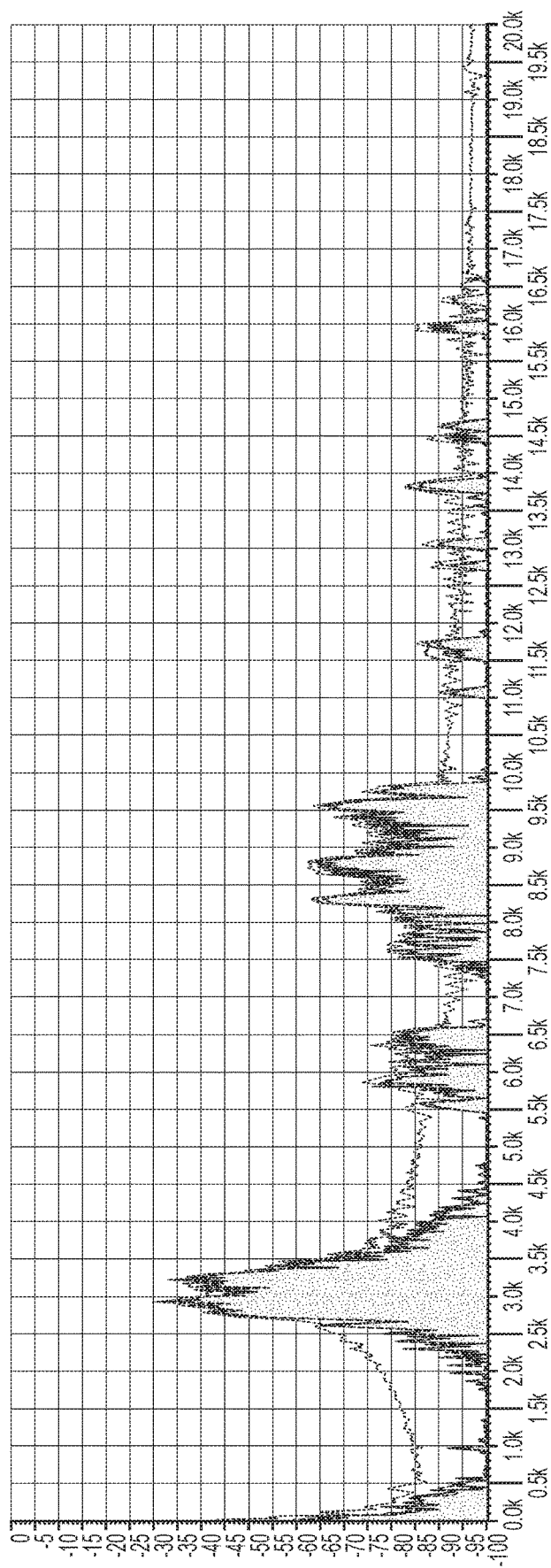
FIG. 4 depicts an exemplary frequency response of an alarm system in accordance with the inventions described herein with the subharmonic frequency components masked.

FIG. 4 depicts the results of an exemplary SPL spectral response performed on sounder 200 when excited by a sequence of signals in the appropriate range of the sounder's 200 resonant frequency. As can be seen in FIG. 4 the strongest output frequency or resonant frequency of the sounder 200 is around 2900 Hz with harmonics at around 5800, 8700 Hz, etc., and calculated subharmonics at 1450 and 967 Hz, etc. Studies into subharmonics indicate subharmonics without specific excitation conditions are not displayed via a typical Fast Fourier Transform SPL response below a certain frequency level if the excitation is not at a specific threshold such as in FIG. 4. Instead, the presence of the subharmonics can be detected via a frequency counter and notch filter at the expected frequency range or laser vibrometer or measuring the feedback level of an electrical excitation at the defined subharmonic frequency.

Logic controller 130 of sounder system 100 is programmed and configured to generate a repetitive frequency shift using internal frequency generation module of the logic controller or optionally a frequency generator external to the logic controller 130 at a predetermined frequency range using a pseudorandom algorithm which changes the output frequency of the frequency that directly or indirectly drives the sounder 200 shifting at an interval of at least every $10^{-4}$ second to another frequency in the predetermined range. Alternatively, the interval is at least every $10^{-6}$ second.

Figure 5:
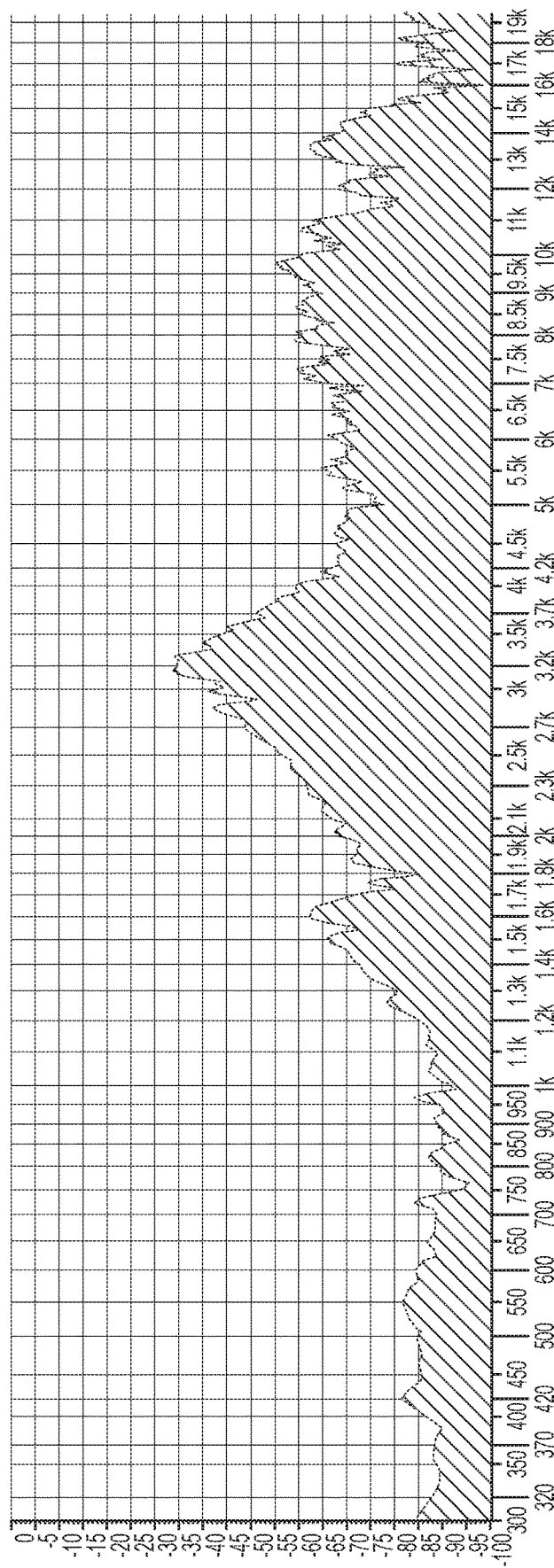
FIG. 5 depicts the results of an exemplary sound pressure level (SPL) spectral response of a sounder used in the alarm system for determining the resonant frequency of the sounder used to configure and program the alarm system according the inventions described herein with the subharmonic frequency components masked.

The predetermined frequency range is any random frequency within a range of +/−8 dB of the loudness of any frequency peak or resonant frequency that the sounder 200 can generate as determined from a spectral response of the sounder. Alternatively, the predetermined frequency range could be defined to be any random frequency within +/−6 dB of the loudness of any of the one or more resonant or peak frequencies that the sounder 200 can generate determined from a spectral response of the sounder. The frequency response of an exemplary alarm generating the tone is depicted in FIG. 5.

The power supply and regulation block 310 powers the loudness booster circuitry 340 which boosts the output loudness. The pseudorandom interval is generated by the logic controller 330 via the preprogrammed software, outputs the corresponding frequency of which the signal is boosted by the loudness booster circuitry 340 and passed to the sounder.

ITD localization cues are achieved by the low frequency components the unit generates. The lower frequencies can either be generated by the pseudorandom interval set to output a frequency range beneath 1500 Hz or by the presence of subharmonics when the output frequency range is set above 1500 Hz.

IID localization cues are achieved by the high frequency components the unit generates. The higher frequencies can be either generated by the pseudorandom interval set to output a frequency range above 5500 Hz or by the presence of harmonics when the output frequency range is set below 5500 Hz.

A slow attack onset is achieved by the digital nature of the alarm manually shifting from one frequency to the next and reproducing only one frequency at a time at a discrete interval minimizing the Franssen Effect.

Adding an intermittent delay has been shown to enhance localization. The delay interval allows for isolated and unique localization datasets for the human localization system to use to decode the source location. While this delay is beneficial, it is not necessary to achieve localization.

The wide range of output signals maximizes the amount of frequencies which the accompanying reverberations are absorbed by physical mediums due to the frequencies wavelength completing as opposed to reflecting off the physical medium. As opposed to being reflected a greater amount of frequencies are only present in a direct fashion and do not need to rely on the Precedence Effect which has been shown to break down. The repetitive nature of the pseudorandom interval provides a large repetitive dataset and maximizes the human localization averaging of acoustic cues and enable a larger data set of accurate cues. When taken into a singular alarm, the localization qualities of the tone are greatly improved.

Previously defined tones include but are not limited to single tone sounds which may be pulsed at a defined interval, sweeping sounds within a defined frequency range and broadband sound filtered to the human auditory range. Single tone and sweeping sounds poorly provide the acoustic localization cues necessary for a human to determine the sounding source from the auditory range as they are uniform and do not provide a large data set to establish localization cues. Broadband sound is limited to systems which can reproduce broadband noise such as loudspeaker systems and provide a miniscule attack time, increasing the Franssen Effect and decreasing localization. In addition, studies into broadband sound such as white or pink noise has expressed the output is more easily confused by the human localization system as embodiments of the ambient noise. For example, white or pink noise will be engrossed in the output of a diesel engine and not discerned as a sounding alarm.

Figure 6:
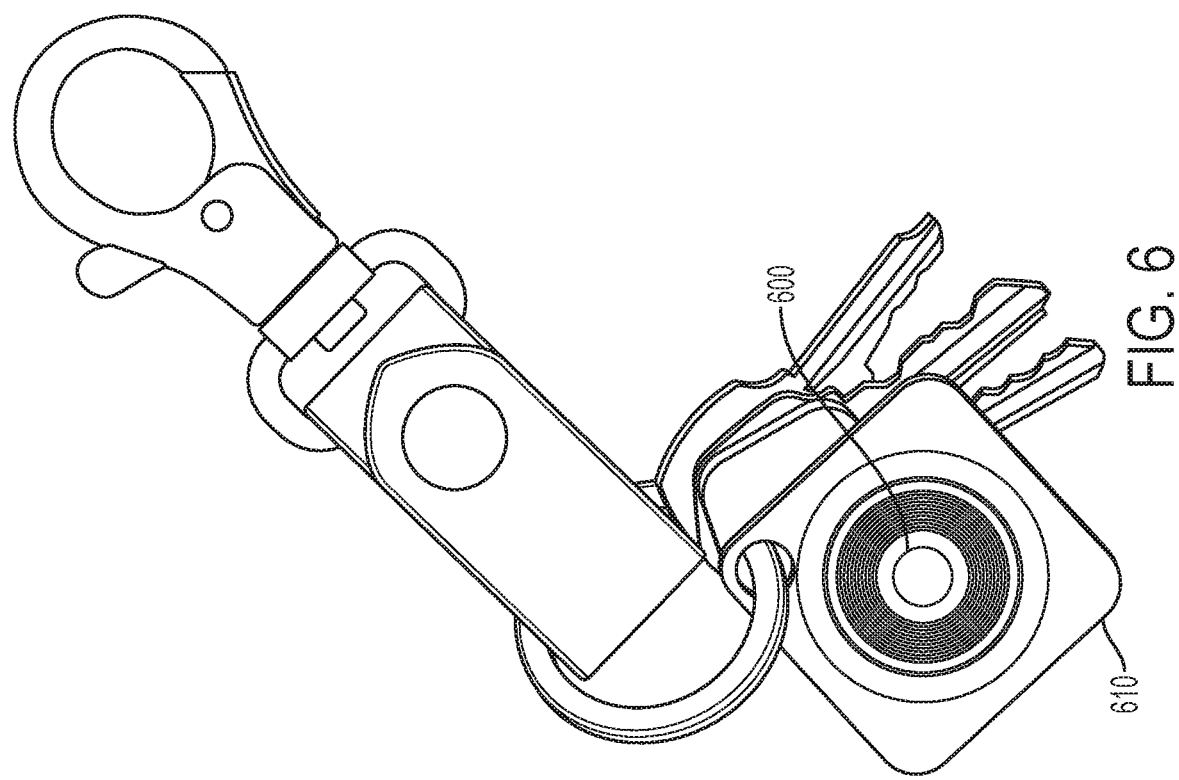
FIG. 6 depicts an exemplary alarm system in accordance with the inventions described herein mounted in an exemplary hardware devices that use Bluetooth or other wireless communications protocols in combination with mobile software applications to locate lost keys, wallets, luggage, or phones.

FIG. 6 depicts an exemplary alarm system 600 in accordance with the inventions described herein mounted in an exemplary hardware device 610 that uses Bluetooth or other wireless communications protocols in combination with mobile software applications to locate lost keys, wallets, luggage, and phones. In these devices, the sounder system can be connected to the same power source for the device itself, and the power source can be a rechargeable or replaceable power source.

Figure 7:
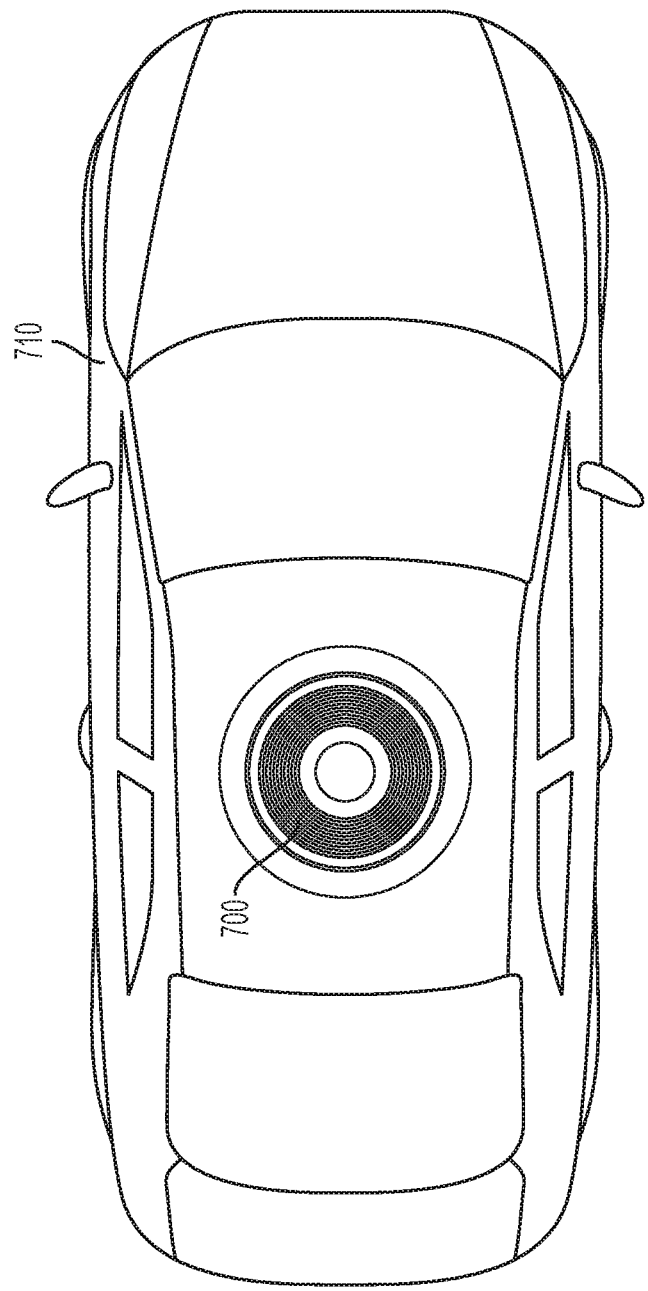
FIG. 7 depicts an exemplary alarm system described herein incorporated in a vehicle.

FIG. 7 depicts an exemplary alarm system 700 described herein incorporated in a vehicle 710. The battery used to power the vehicle can also be the source of power that powers the alarm system. The alarm system 700 is depicted in the roof of the vehicle, but it can be placed anywhere in the vehicle 710, including the front (may be better for an emergency vehicle) or rear (may be better for a reversing vehicle).

An additional embodiment of the alarm system can be created by making auditory recording of an alarm sound produced using the alarm system described above having a piezoelectric plate mounted in a Helmholtz resonator cavity driven repetitively over pseudorandom frequencies as that is saved on electronic data storage connected to a dynamic loudspeaker system capable of reproducing the acoustic properties of the alarm sound stored on the electronic data storage. The alarm has a controller configured to play back the auditory recording of the alarm over the dynamic loudspeaker system.

One skilled in the art will realize the invention may be embodied in other specific forms without departing from the spirit or essential characteristics thereof. The foregoing embodiments are therefore to be considered in all respects illustrative rather than limiting of the invention described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. An alarm system comprising:
   a voltage regulator;
   a logic controller; and
   a sounder,
   wherein the sounder is directly or indirectly connected to the logic controller and a frequency generator, wherein the sounder comprises a piezoelectric disk mounted in a Helmholtz resonator cavity and the sounder has one or more peak or resonant frequencies,
   the logic controller configured and programmed to generate at least every $10^{-4}$ second a pseudorandom repetitive frequency within a predetermined range of frequencies to directly or indirectly drive the sounder, and
   wherein the predetermined range of frequencies is any frequency within a range of +/−8 dB of the one or more peak or resonant frequencies.

2. The alarm system of claim 1, further comprising an amplifier and filter directly or indirectly connected to the voltage generator and the sounder.

3. The alarm system of claim 1, wherein the one or more peak or resonant frequencies are determined from a sound pressure level (SPL) spectral response that incrementally generates increased frequencies over the sounder or measures a feedback level of an applied signal through the sounder.

4. The alarm system of claim 2, wherein the one or more peak or resonant frequencies are determined from a sound pressure level (SPL) spectral response that incrementally generates increased frequencies over the sounder or measures a feedback level of an applied signal through the sounder.

5. The alarm system of claim 1, wherein the predetermined frequency range is any frequency within a range of +/−6 dB from any of the one or more peak or resonant frequencies of the sounder.

6. The alarm system of claim 2, wherein the predetermined frequency range is any frequency within a range of +/−6 dB from any of the one or more peak or resonant frequencies of the sounder.

7. The alarm system of claim 3, wherein the predetermined frequency range is any frequency within a range of +/−6 dB from any of the one or more peak or resonant frequencies of the sounder.

8. The alarm system of claim 4, wherein the predetermined frequency range is any frequency within a range of +/−6 dB from any of the one or more peak or resonant frequencies of the sounder.

9. The alarm system of claim 1, wherein the logic controller is configured and programmed to generate the pseudorandom repetitive frequency within the predetermined range shifting at least every $10^{-6}$ second to directly or indirectly drive the sounder.

10. The alarm system of claim 2, wherein the logic controller is configured and programmed to generate the pseudorandom repetitive frequency within the predetermined range shifting at least every $10^{-6}$ second to directly or indirectly drive the sounder.

11. The alarm system of claim 3, wherein the logic controller is configured and programmed to generate the pseudorandom repetitive frequency within the predetermined range shifting at least every $10^{-6}$ second to directly or indirectly drive the sounder.

12. The alarm system of claim 4, wherein the logic controller is configured and programmed to generate the pseudorandom repetitive frequency within the predetermined range shifting at least every $10^{-6}$ second to directly or indirectly drive the sounder.

13. The alarm system of claim 1, wherein the logic controller is configured and programmed to interrupt the generation of the pseudorandom frequency at a rate of 1 pulse per second.

14. The alarm system of claim 2 wherein the logic controller is configured and programmed to interrupt the generation of the pseudorandom frequency at a rate of 1 pulse per second.

15. The alarm system of claim 3, wherein the logic controller is configured and programmed to interrupt the generation of the pseudorandom frequency at a rate of 1 pulse per second.

16. The alarm system of claim 4 wherein the logic controller is configured and programmed to interrupt the generation of the pseudorandom frequency at a rate of 1 pulse per second.

17. The alarm system of claim 1, wherein the logic controller is programmed to repeat continually after sweeping through all frequencies in the predetermined frequency range.

18. The alarm system of claim 2, wherein the logic controller is programmed to repeat continually after sweeping through all frequencies in the predetermined frequency range.

19. The alarm system of claim 3, wherein the logic controller is programmed to repeat continually after sweeping through all frequencies in the predetermined frequency range.

20. The alarm system of claim 4, wherein the logic controller is programmed to repeat continually after sweeping through all frequencies in the predetermined frequency range.

21. The alarm system according to claim 1, further comprising data storage and a controller connected to a loudspeaker, wherein the data storage comprises a recording of an alarm generated with the alarm system, and the controller is configured and programmed to play the recording over the loudspeaker.

22. The alarm system according to claim 2, further comprising data storage and a controller connected to a loudspeaker, wherein the data storage comprises a recording of an alarm generated with the alarm system, and the controller is configured and programmed to play the recording over the loudspeaker.

23. The alarm system according to claim 3, further comprising data storage and a controller connected to a loudspeaker, wherein the data storage comprises a recording of an alarm generated with the alarm system, and the controller is configured and programmed to play the recording over the loudspeaker.

24. An alarm system according to claim 4, further comprising data storage and a controller connected to a loudspeaker, wherein the data storage comprises a recording of an alarm generated with the alarm system, and the controller is configured and programmed to play the recording over the loudspeaker.

25. A tracking device comprising:
an alarm system comprising:
a sounder comprising a piezoelectric plate mounted on a Helmholtz resonator, the sounder having one or more peak or resonant frequencies;
a logic controller connected to the sounder, wherein the logic controller is configured and programmed to generate a pseudorandom repetitive frequency within a predetermined range shifting at least every $10^{-4}$ second to directly or indirectly drive the sounder, wherein the predetermined range is +/−8 dB from any of the one or more peak or resonant frequencies.

26. The tracking device of claim 25, wherein the logic controller is configured and programmed to generate a pseudorandom repetitive frequency within a predetermined range at least every $10^{-6}$ second to directly or indirectly drive the sounder, and the predetermined range is +/−6 dB from any of the one or more peak or resonant frequencies.

27. The tracking device of claim 26, wherein the logic controller is programmed to repeat continually after sweeping through all frequencies in the predetermined frequency range.

* * * * *